United States Patent [19]

Greenhill et al.

[11] Patent Number: 4,901,987
[45] Date of Patent: Feb. 20, 1990

[54] CREST-TO-CREST COMPRESSION SPRING WITH CIRCULAR FLAT SHIM ENDS

[75] Inventors: Charles Greenhill, Northbrook; Michael Greenhill, Deerfield, both of Ill.

[73] Assignee: Smalley Steel Ring Company, Wheeling, Ill.

[21] Appl. No.: 189,651

[22] Filed: May 3, 1988

[51] Int. Cl.$^4$ ................................................. F16F 1/06
[52] U.S. Cl. ....................................... 267/166; 267/182
[58] Field of Search ............... 267/181, 161, 162, 163, 267/164, 165, 166, 167, 147, 174, 182, 272, 47; 464/78, 88

[56] References Cited

U.S. PATENT DOCUMENTS

| | | | |
|---|---|---|---|
| 101,724 | 4/1870 | French | 267/166 |
| 338,267 | 3/1886 | Hearle | 267/166 |
| 361,298 | 4/1887 | Kilmer . | |
| 1,523,225 | 1/1925 | Lukens | 267/166 |
| 2,607,582 | 8/1952 | Jurgens . | |
| 2,982,323 | 5/1961 | Vossloh . | |
| 3,015,482 | 1/1962 | Maker . | |
| 3,021,129 | 2/1962 | Maker . | |
| 3,391,910 | 7/1968 | Prahl . | |
| 4,120,489 | 10/1978 | Borlinghaus | 267/166 X |

OTHER PUBLICATIONS

Okuno Machine Catalog, 1988, Okuno Machine Co., Osaka, Japan, (Okuno).

Primary Examiner—George E. A. Halvosa
Attorney, Agent, or Firm—Lockwood, Alex, Fitzgibbon & Cummings

[57] ABSTRACT

A multiturn, crest to crest, waved compression spring is formed with flat circular shim end portions which form load support surfaces at opposite ends of the spring which are generally perpendicular to the spring longitudinal axis. The compression spring includes three distinct wave regions in which the first distinct wave region has a constant, preselected amplitude, the second distinct wave region has a gradually and incrementally diminishing amplitude and the third distinct wave region has a constant zero amplitude.

22 Claims, 1 Drawing Sheet

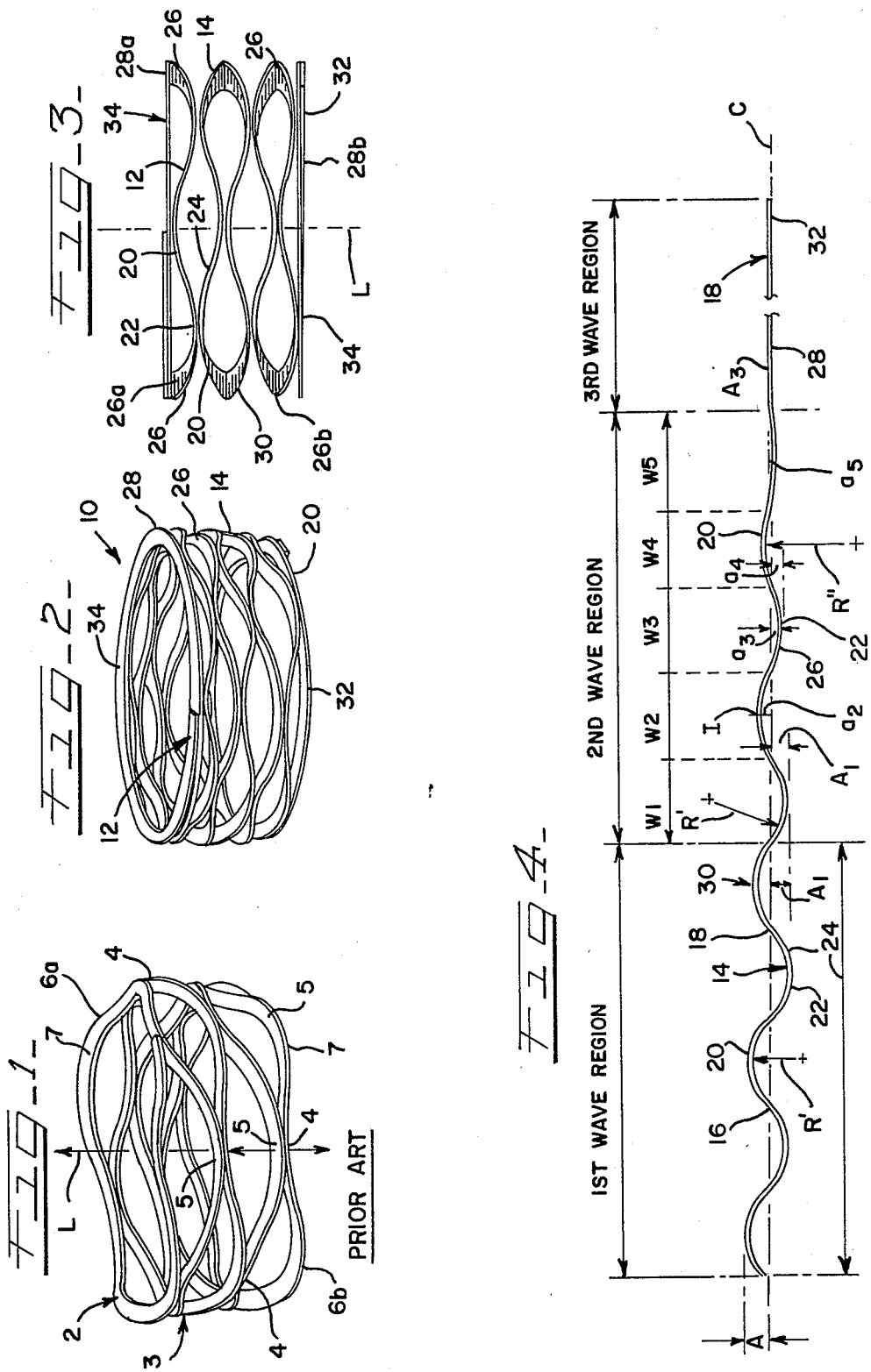

CREST-TO-CREST COMPRESSION SPRING WITH CIRCULAR FLAT SHIM ENDS

BACKGROUND AND SUMMARY OF THE INVENTION

This invention relates generally to compression springs and more particularly to a compression spring made from an elongate flat strip which is circularly coiled and formed with circular flat shim portions at opposite ends of the compression spring.

Crest-to-crest compression springs are coiled springs which are typically made from a flat metal strip and formed in a generally sinusoidal wave pattern. These springs are described as "crest-to-crest" because of the particular orientation of the individual spring turns in which the crest portions of the waves of one turn abut the trough portions of the waves in the turns immediately adjacent it.

In an ordinary crest-to-crest compression spring, an imbalance of the spring occurs due to the difficulty of arranging a completely symmetrical orientation of the crests (or troughs) of successive waves of the final spring turns at the opposite ends of the spring. The compression spring naturally tilts toward the point on its ends where the spring is lacking a wave crest portion to supply the required balance to the spring as a result of the helical format. Also, a continuous coiled spring naturally possesses a helical pitch at its spring ends which results in the lack of a support surface which is perpendicular to the spring longitudinal axis. This can cause an imbalance which becomes apparent when the spring is loaded, where the loading member rests on the wave crest portions of the last turn of the compression spring ends. Due to this imbalance, such compression springs can undergo uneven axial pressures when loaded. These uneven axial loads can cause the spring to exert opposite forces in both its radial and axial directions which detract from the designed load carrying ability of the spring, which is to exert a force only along the axial direction.

To minimize this imbalance problem, the compression spring designer must either increase the number of waves per spring turn to provide additional load support wave crest portions or decrease the amplitude of each wave of the entire spring to decrease the imbalance at the spring ends.

Other attempts to solve this imbalance problem have included using round wire for the compression spring in which the round wire at the opposite end portions of the compression spring are ground to form flat disc-like load support surfaces. However, this method is relatively expensive and time consuming, but it also requires a thick wire cross-section to provide a strong load support surface at the spring ends.

The present invention avoids the above-mentioned shortcomings. In a compression spring incorporating the principles of the present invention, a circular spring is formed from a flat, elongate wire strip into a continuous circular and substantially sinusoidal wavepath in which substantially all of the waves in the center turns of the compression spring have the same amplitude and wherein the waves in the spring turns adjacent the center turns have a diminishing amplitude which incrementally diminishes down to zero amplitude such that a portion of each of the last spring turns at opposite ends of the spring forms a flat circular shim end, which forms a plane generally perpendicular to the longitudinal axis of the spring.

Accordingly it a general object of the present invention to provide a new and improved spiral-wound compression spring having flat ends.

It is another object of the present invention to provide a multiturn crest-to-crest compression spring in which the compression spring has flat shim portions at opposite ends of the spring which provide uniform support surfaces for the spring which are substantially perpendicular to the longitudinal axis of the spring.

It is a further object of the present invention to provide a crest-to-crest spirally wound compression spring in which the crest and troughs of some of the waves diminish in amplitude down to zero such that flat circular shim ends are formed on opposite ends of the longitudinal axis of the compression spring.

It is yet a further object of the present invention to eliminate uneven axial and radial loading in a compression spring by incorporating balancing means in a compression spring by gradually tapering the heights of successive waves in certain successive spring turns to form a flat circular shim for the spring to rest on at its opposite ends, thereby providing the compression spring which exerts a force in only the axial direction when loaded under compression, eliminating the combination of radial and axial forces in the spring.

These and other objects features and advantages of the present invention will be clearly understood through a consideration of the following detailed description.

BRIEF DESCRIPTION OF THE DRAWINGS

In the course of the description, reference will be made to the attached drawings in which:

FIG. 1 is a perspective view of a conventional crest-to-crest compression spring;

FIG. 2 is a perspective view of a compression spring constructed in accordance with the principles of the present invention;

FIG. 3 is an elevation view of the compression spring shown in FIG. 2; and,

FIG. 4 is a diagrammatic view of one-half of the compression spring shown in FIG. 2 and uncoiled along its length.

DETAILED DESCRIPTION OF THE INVENTION

FIG. 1 shows a conventional crest-to-crest compression spring 2. As can be seen in FIG. 1, each turn 3 of the compression spring includes successive wave crest portions 4 and trough portions 5 which follow a substantially sinusoidal wavepath. The crest portions 4 of one spring turn abut the trough portion 5 of the spring turn lying adjacent to it either above or below it. Typically the opposite ends 6a, 6b of the compression spring will terminate at the end of the last wave present in the spring turns. As such, neither of the ends of this type compression spring presents a load support surface 7 at the spring ends which is substantially perpendicular to the spring longitudinal axis L. Rather, the last spring turn on each spring end follows a helical spiral such that it does not form a flat plane which is perpendicular to the spring longitudinal axis L. When set down on a flat surface, the compression spring 2 tends to tilt to one side either in its free state or when loaded with a work member (not shown).

A compression spring 10 having circular flat shim end portions at its opposite ends constructed in accordance with the principles of the present invention is shown in FIG. 2. The compression spring 10 is formed by helically edgewinding a continuous elongate flat metal strip 12 in a wave format wherein each individual spring turn is formed in a wave pattern which includes a series of waves 14. Each individual wave has a pair of end points 16, 18 and includes therebetween a wave crest portion 20 which is successively followed by a wave trough portion 22. The spacing of the pattern is such that each of the wave crest portions 20 of each individual turn generally abuts trough portions 22 of the individual spring turn adjacent that crest. This particular type of spring turn configuration is commonly referred to in the art as a crest-to-crest winding.

In an important aspect of the present invention, and as is generally shown in FIG. 2 and more specifically in FIG. 4, the spring 10 significantly departs from the common crest-to-crest winding format in that the continuous strip 12 of the compression spring 10 has three distinct wave regions 24, 26, 28 formed therein. The overall amplitude of the waves in any one of these three wave regions is generally not equal to the overall amplitude of the waves in the remaining wave regions. As used herein, the wave amplitude is defined as the distance from the spring turn centerline C to the peak of either the wave crest or wave trough. This distance is generally equal to one-half of the free height of a individual wave.

Two of these three wave regions, specifically the first wave region 24 and the second wave region 26 comprise at least one complete spring turn, that is, the metal strip 12 in each of these regions makes one complete revolution of 360° around the longitudinal spring axis L. The first wave region 24 is located in approximately the center portion 30 of the spring 10. One or more spring turns may be present in the first wave region 24 and each such turn includes a series of successive waves which define a substantially sinusoidal wavepath. The amplitude $A_1$ of all of the successive waves in the first wave region 24 is a constant preselected amplitude.

The second wave region 26 includes the two separate second wave region portions 26a, 26b which occupy the two areas of the compression spring which are disposed adjacent to the first wave region 24 on opposite ends thereof and are separated thereby. This second wave region 26 includes one spring turn (360°) Importantly, the amplitude $A_2$ of the waves in this second wave region 26 is variable. The second wave region amplitude $A_2$ is gradually and incrementally diminished down to a zero amplitude by an incremental reduction value I. Because each individual wave contains a corresponding wave crest and wave trough, the amplitude of each successive wave crest and wave trough in the second wave region is reduced by I.

This incremental value I is obtained from the following formula:

$$I = \frac{A_1}{N}$$

where:

$A_1$ = the amplitude of the waves in the first wave region (in.)

N = the number of wave crest and wave trough portions found in one complete spring turn (360° of the second wave region.

In applying the reduction value, the amplitude of the first wave crest or wave trough which begins each second wave region portion is equal to the constant wave amplitude $A_1$ of the first wave region. Successive wave crests and wave troughs in the second wave region portion gradually diminish in amplitude by I such that the final wave crests or wave troughs which end the second wave region portions have an amplitude equal to I.

The dimishing amplitude of the second wave region 26 can best be explained by way of example. Turning to the one-half portion of the uncoiled spring 10 shown in FIG. 4, the second wave region portion 26b is shown as having two and one-half waves comprising a total of five wave crest and wave trough portions, $W_1$–$W_5$ with each wave crest or trough portion having an individual amplitude $A_n$ associated therewith.

For this example, the amplitude $A_1$ of the first wave region 24 is chosen as 1.0 inches. The incremental reduction valve I is obtained from the formula above:

$$I = \frac{1.0}{5} \text{ inches} = 0.2 \text{ inches}$$

Therefore, the amplitude of each individual wave crest and wave trough portion which follows the first wave crest or trough portion is reduced by 0.2 inches as shown in the following table.

| Wave portion | $W_1$ | $W_2$ | $W_3$ | $W_4$ | $W_5$ |
|---|---|---|---|---|---|
| Amplitude (in.) $A_n$ | $a_1 = 1.0$ | $a_2 = 0.8$ | $a_3 = 0.6$ | $a_4 = 0.4$ | $a_5 = 0.2$ |

The wave amplitude reduction will continue until the last wave portion $W_5$ of second wave region portion 26b has an amplitude equal to I, or 0.2 inches. At the end this wave trough portion, $W_5$ which ends the second wave region portion 26b, the wave amplitude is zero amplitude and the third wave region portions 28b begins. Throughout this reduction of second region wave amplitude, the radius of the wave portions, R increases.

The third wave region 28 includes two separate third wave region portions 28a, 28b which lie adjacent to and outwardly of the two second wave region portions 26. Each of the third wave region portions 28a, 28b includes a portion of a spring turn in which the wave amplitude $A_3$ is equal to zero. The third wave region portion spring turns each extends for an angular revolution around the compression spring longitudinal axis L of between 300° and 540°, with a preferred angular revolution being between 360° and 540°. The zero amplitude of the waves in these third wave region portions thereby form two substantially flat shim portions 32 in the spring turns at opposite ends of the spring. These shim portions 32 provide a substantially flat and uniform load support surface 34 at the spring opposite ends which substantially prevent uneven axial loading of the compression spring.

It will be appreciated that the embodiments of the present invention that have been discussed herein are merely illustrated of a few applications of the principles of the invention. Numerous modifications may be made with those skilled in the art without departing from the true spirit and scope of the invention.

What we claim is:

1. In a crest-to-crest compression spring formed from a continuous elongate flat wire strip which is generally spirally wound in a circle around a longitudinal spring axis and a common edge of the strip to form a plurality of individual spring turns lying adjacent each other so as to form a multiturn compression spring, each spring turn comprising a plurality of successive waves which waves include separate wave crest and wave trough portions, the improvement comprising three distinct wave regions wherein the amplitude of the waves disposed in one region generally differs from the amplitude of the waves in the other two regions, the first wave region being disposed in approximately the center turns of said compression spring and including one or more spring turns, the amplitude of all of the waves in the first wave region being a constant amplitude, the second wave region including two separate second wave region portions disposed generally adjacent to and outwardly of said first wave region on opposite ends thereof and having a free height, said second wave region portions each including at least one spring turn, the amplitude of all the waves in the second region being variable and generally unequal to the first wave region amplitude, said second wave region wave amplitude varying from the first wave region amplitude down to a zero wave amplitude uniformly within said second wave region, the third wave region beginning where said second wave region wave amplitude reaches said zero wave amplitude, said third wave region including two separate third wave region portions disposed generally adjacent to and outwardly of said two second wave region portions, each third wave region including between three quarter and one and one-half spring turns, the amplitude of the wave in each said third wave region being a constant zero amplitude so as to form a flat wave in each of said third wave region portions, whereby said third wave region portions form flat circular shim portions having a substantially uniform thickness at opposite ends of said compression spring which are generally perpendicular to said spring longitudinal axis and which are generally parallel to each other.

2. The compression spring of claim 1 wherein the flat elongate wire is edgewound about said spring longitudinal axis.

3. The compression spring of claim 1, wherein the first wave region includes one spring turn extending 360° of revolution around said spring longitudinal axis.

4. The compression spring of claim 1, wherein each of said third wave region portions includes a spring turn which extends between 300° and 540° of revolution about said spring longitudinal axis.

5. The compression spring of claim 1, wherein said first wave region includes one spring turn extending 360° of revolution about the spring longitudinal axis and each of said third wave region portions includes a spring turn which extends between 300° and 540° of revolution about said spring longitudinal axis.

6. The compression spring of claim 1, wherein said amplitude of the waves in said first wave region is equal to approximately one-half of the free height of a single turn of the central portion of said first wave region.

7. The compression spring of claim 1, wherein each of said third wave region portions include a spring turn which extends between 360° and 540° of revolution around said spring longitudinal axis.

8. The compression spring of claim 1, wherein said amplitude of said waves in said second wave region portions incrementally diminishes down from said first wave region amplitude to zero amplitude.

9. The compression spring of claim 1, wherein said second wave region portions wave amplitude incrementally diminishes down from said first wave region amplitude to zero amplitude in incremental values, each successive wave crest or trough portion of each second wave region portion being incrementally reduced in amplitude by an incremental factor, I, derived from the following formula:

$$I = \frac{A}{N}$$

wherein
A=The first wave region wave amplitude (in.).
N=The number of wave crests and wave troughs portions in one spring turn in a second wave region portion.

10. A crest-to-crest circular, resilient, compression spring having load support surfaces for supporting a work element thereon disposed at opposite ends of said spring the spring being formed from an elongate flat wire strip spirally wound around a common edge of the wire strip and around the longitudinal axis of the spring to form a series of spring turns, the compression spring having two free ends at opposite end portions of said spring, each of the spring turns lying adjacent to each other so as to form a multiturn ring, each of said spring turns having a plurality of successive waves therein, each of said waves including separate wave crest and wave trough portions, said waves defining a wavepath between the opposite free ends of said spring, the amplitude of the waves in said wavepath incrementally diminishing from a preselected wave amplitude present in the central portions of the spring down to a zero wave amplitude at the opposite ends of said spring, said spring including three continuous and distinct wave regions, the first distinct wave regions being generally disposed in the central portion of the spring, said first distinct wave region including at least one spring turn, the second distinct wave region including two second wave region portions disposed generally adjacent to and outwardly of said first distinct wave region, the two second distinct wave region portions each having a free height and each including one spring turn, and the third distinct wave region including two third distinct wave region portions disposed generally adjacent to and outwardly of said two second wave region portions, the amplitude of the waves in each of said second distinct wave region portions incrementally diminishing down from said first wave region preselected wave amplitude uniformly within said second wave region to a zero wave amplitude in said third wave region, said third wave region beginning where said second wave region wave amplitude reaches said zero wave amplitude, the opposite ends of said spring each including portions of a spring turn which have a constant zero wave amplitude, said third wave region portions forming two load support surfaces which are substantially perpendicular to the longitudinal axis of said compression spring and are substantially parallel to each other, each of said two load support surfaces having a substantially uniform thickness.

11. The compression spring of claim 10, wherein each of said two third distinct wave region portions includes a spring turn which extends between 300° and 540° of revolution around the spring longitudinal axis.

12. The compression spring of claim 10, wherein each of said two third distinct wave region portions includes a spring turn which extends between 360° and 540° of revolution around the spring longitudinal axis.

13. The compression surface of claim 10, wherein each of the spring load support surfaces includes a spring turn which extends between 300° and 540° of revolution around the spring longitudinal axis.

14. The compression spring of claim 10, wherein the overall amplitude of the waves in each of the three regions is generally unequal to the overall amplitude of the waves in the remaining regions, the first distinct wave region comprising one or more spring turns extending 360° of revolution around said spring longitudinal axis, each of said two second distinct wave region portions including one spring turn extending 360° of revolution around said spring longitudinal axis, each of said third wave region portions including a spring turn which extends between 360° and 540° of revolution around said spring longitudinal axis.

15. The compression spring of claim 10, wherein each of said third distinct wave region portions includes a spring turn which extends between 360° and 540° of revolution around said spring longitudinal axis.

16. The compression spring of claim 10, wherein the radius of said waves in said three distinct wave regions increases as said waves extend from the first wave region to said third wave region.

17. The compression spring of claim 10, wherein said first wave region preselected wave amplitude is equal to approximately one-half of the free height of a single turn of the central portion of the spring.

18. The compression spring of claim 10, wherein the amplitude of successive wave crest and wave trough portion in each of said two second distinct wave region portions incrementally diminishes down from said first distinct wave region wave amplitude to zero wave amplitude by an incremental reduction factor of I which is derived from the following formula:

$$I = \frac{A}{N}$$

wherein:
A = The amplitude of the first distinct wave region (in.).
N = The number of wave crests and trough portions per spring turn found in the second wave region portion.

19. A crest-to-crest circular, resilient, compression spring having load support surfaces for supporting a work element thereon disposed at opposite ends of said spring, the ring being formed from an elongate flat wire strip spirally wound around a common edge of the wire strip and around the longitudinal axis of the spring to form a series of spring turns, the compression spring having two free ends at opposite end portions of said spring, each of the spring turns lying adjacent to each other so as to form a multiturn ring, each of said spring turns having a plurality of successive waves therein, each of said waves including separate wave crest and wave trough portions, said waves defining a wavepath between the opposite free ends of said spring, the amplitude of the waves in said wavepath incrementally diminishing from a preselected wave amplitude present in the central portions of the spring down to a zero wave amplitude at the opposite ends of said spring, said spring including three continuous and distinct wave regions, the first distinct wave region including at least one spring turn and being disposed generally in the central portion of the spring, the waves of said first distinct wave region having a constant amplitude, the second distinct wave region including two second wave region portions disposed generally adjacent to and outwardly of said first distinct wave region, the two second distinct wave region portions each having a free height and the waves of each of said second distinct wave region portions having a variable amplitude and each second distinct wave region portion including one spring turn, and a third distinct wave region including two third distinct wave regions portions disposed generally adjacent to and outwardly of said two second wave region portions, each of said third distinct wave region portions including a single wave of constant zero amplitude, the amplitude of each of said second distinct wave portions incrementally diminishing down in a uniform manner from said constant wave amplitude of the first wave region to the constant zero wave amplitude in the third wave region, the amplitude of successive wave crest and wave trough portions in each of said two second distinct wave region portions being incrementally diminished in said uniform manner by an incremental reduction factor of I derived from the formula:

$$I = \frac{A}{N}$$

wherein:
A = The amplitude of the first distinct wave region (in.).
N = The number of wave crests and trough portions per spring turn found in the second wave region portion, said third wave regions beginning where said second wave region portions reach a zero wave amplitude, each of said third distinct wave region portions of constant zero wave amplitude including a spring turn which extends between 300° and 540° of revolution around said spring longitudinal axis, said third distinct wave region portions thereby forming two compression spring load support surfaces which are substantially perpendicular to the longitudinal axis of said compression spring and which are substantially parallel to each other, each of said load support surfaces having a substantially equal and uniform thickness.

20. The compression spring of claim 19, wherein the radius of said waves in said three distinct wave regions increases as said waves extend from the first wave region to said third wave region.

21. The compression spring of claim 19, wherein said first wave region preselected wave amplitude is equal to approximately one-half of the free height of a single turn of the central portion of the spring.

22. The compression spring of claim 19, wherein each of said two third distinct wave region portions includes a spring turn which extends between 360° and 540° of revolution around the spring longitudinal axis.

* * * * *